(12) United States Patent
Meixner et al.

(10) Patent No.: US 10,675,745 B2
(45) Date of Patent: *Jun. 9, 2020

(54) HAND-HELD POWER TOOL, FANLESS STORAGE BATTERY

(71) Applicant: Hilti Aktiengesellschaft, Schaan (LI)

(72) Inventors: Ralf Meixner, Germaringen (DE); Manfred Jakob, Kaufering (DE); Thomas Thanner, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 297 days.

This patent is subject to a terminal disclaimer.

(21) Appl. No.: 15/531,985

(22) PCT Filed: Nov. 30, 2015

(86) PCT No.: PCT/EP2015/078006
§ 371 (c)(1),
(2) Date: May 31, 2017

(87) PCT Pub. No.: WO2016/087341
PCT Pub. Date: Jun. 9, 2016

(65) Prior Publication Data
US 2017/0326718 A1  Nov. 16, 2017

(30) Foreign Application Priority Data
Dec. 1, 2014  (EP) ..................... 14195558

(51) Int. Cl.
*B25F 5/00* (2006.01)
*H01M 10/6235* (2014.01)
(Continued)

(52) U.S. Cl.
CPC .............. *B25F 5/008* (2013.01); *B25D 11/00* (2013.01); *B25D 16/00* (2013.01); *B25D 17/20* (2013.01);
(Continued)

(58) Field of Classification Search
CPC ......... H01M 10/6235; H01M 10/6563; H01M 10/486; B25D 11/00; B25D 16/00; B25D 17/20
(Continued)

(56) References Cited

U.S. PATENT DOCUMENTS 6,455,186 B1   9/2002  Moores, Jr. et al.
6,645,666 B1  11/2003  Moores, Jr. et al.
(Continued)

FOREIGN PATENT DOCUMENTS

CN   101543967 A    9/2009
CN   102842930 A   12/2012
(Continued)

OTHER PUBLICATIONS

U.S. Appl. No. 15/531,977.*
(Continued)

*Primary Examiner* — Nathaniel C Chukwurah
(74) *Attorney, Agent, or Firm* — Crowell & Moring LLP

(57) ABSTRACT

A hand-held power tool, in particular a hammer drill or a combination hammer, is disclosed. The hand-held power tool includes a tool housing which has a receiving recess designed to replaceably receive a storage battery or a power supply unit. The hand-held power tool has an electric drive motor with a cooling fan. The tool housing has a first vent portion which is located in the receiving recess and through which a volume flow generated by the cooling fan can be guided.

9 Claims, 7 Drawing Sheets

(51) Int. Cl.
*H01M 10/6563* (2014.01)
*B25D 11/00* (2006.01)
*B25D 16/00* (2006.01)
*B25D 17/20* (2006.01)
*H01M 10/48* (2006.01)

(52) U.S. Cl.
CPC ..... *H01M 10/486* (2013.01); *H01M 10/6235* (2015.04); *H01M 10/6563* (2015.04); *B25D 2217/0061* (2013.01); *H01M 2220/30* (2013.01)

(58) Field of Classification Search
USPC .................. 173/213, 217, 216, 201, 212, 48
See application file for complete search history.

(56) References Cited

U.S. PATENT DOCUMENTS

| | | |
|---|---|---|
| 6,949,309 B2 | 9/2005 | Moores, Jr. et al. |
| 7,014,945 B2 | 3/2006 | Moores, Jr. et al. |
| 7,056,616 B2 | 6/2006 | Moores, Jr. et al. |
| 7,252,904 B2 | 8/2007 | Moores, Jr. et al. |
| 7,326,490 B2 | 2/2008 | Moores, Jr. et al. |
| 7,736,792 B2 | 6/2010 | Moores, Jr. et al. |
| 7,939,193 B2 | 5/2011 | Moores, Jr. et al. |
| 8,418,780 B2 * | 4/2013 | Lau ........................ B25F 5/008 173/171 |
| 9,132,542 B2 | 9/2015 | Lau et al. |
| 2002/0034682 A1 | 3/2002 | Moores, Jr. et al. |
| 2002/0197527 A1 | 12/2002 | Moores, Jr. et al. |
| 2003/0027037 A1 | 2/2003 | Moores, Jr. et al. |
| 2004/0124721 A1 * | 7/2004 | Pfisterer ................. B25D 17/20 310/51 |
| 2004/0174138 A1 | 9/2004 | Moores, Jr. et al. |
| 2004/0175610 A1 | 9/2004 | Moores, Jr. et al. |
| 2005/0202310 A1 * | 9/2005 | Yahnker ................. B25F 5/008 429/62 |
| 2006/0110656 A1 | 5/2006 | Moores, Jr. et al. |
| 2008/0102355 A1 | 5/2008 | Moores, Jr. et al. |
| 2011/0303718 A1 * | 12/2011 | Spasov ..................... B25C 1/06 227/2 |
| 2012/0327573 A1 | 12/2012 | Glauning |
| 2017/0334055 A1 | 11/2017 | Meixner et al. |

FOREIGN PATENT DOCUMENTS

| | | |
|---|---|---|
| CN | 107073695 A | 8/2017 |
| DE | 10 2007 039 828 B3 | 11/2008 |
| DE | 10 2008 060 703 A1 | 6/2009 |
| DE | 10 2009 015 422 A1 | 10/2009 |
| EP | 0 940 864 A2 | 9/1999 |

OTHER PUBLICATIONS

PCT/EP2015/078006, International Search Report (PCT/ISA/210 and PCT/ISA/220) dated Jan. 26, 2016, with partial English translation, enclosing Written Opinion of the International Searching Authority (PCT/ISA/237) (Sixteen (16) pages).

U.S. Patent Application, "Handheld power tool, fanless power supply unit and tool system", filed May 31, 2017, Inventor Ralf Meixner et al.

\* cited by examiner

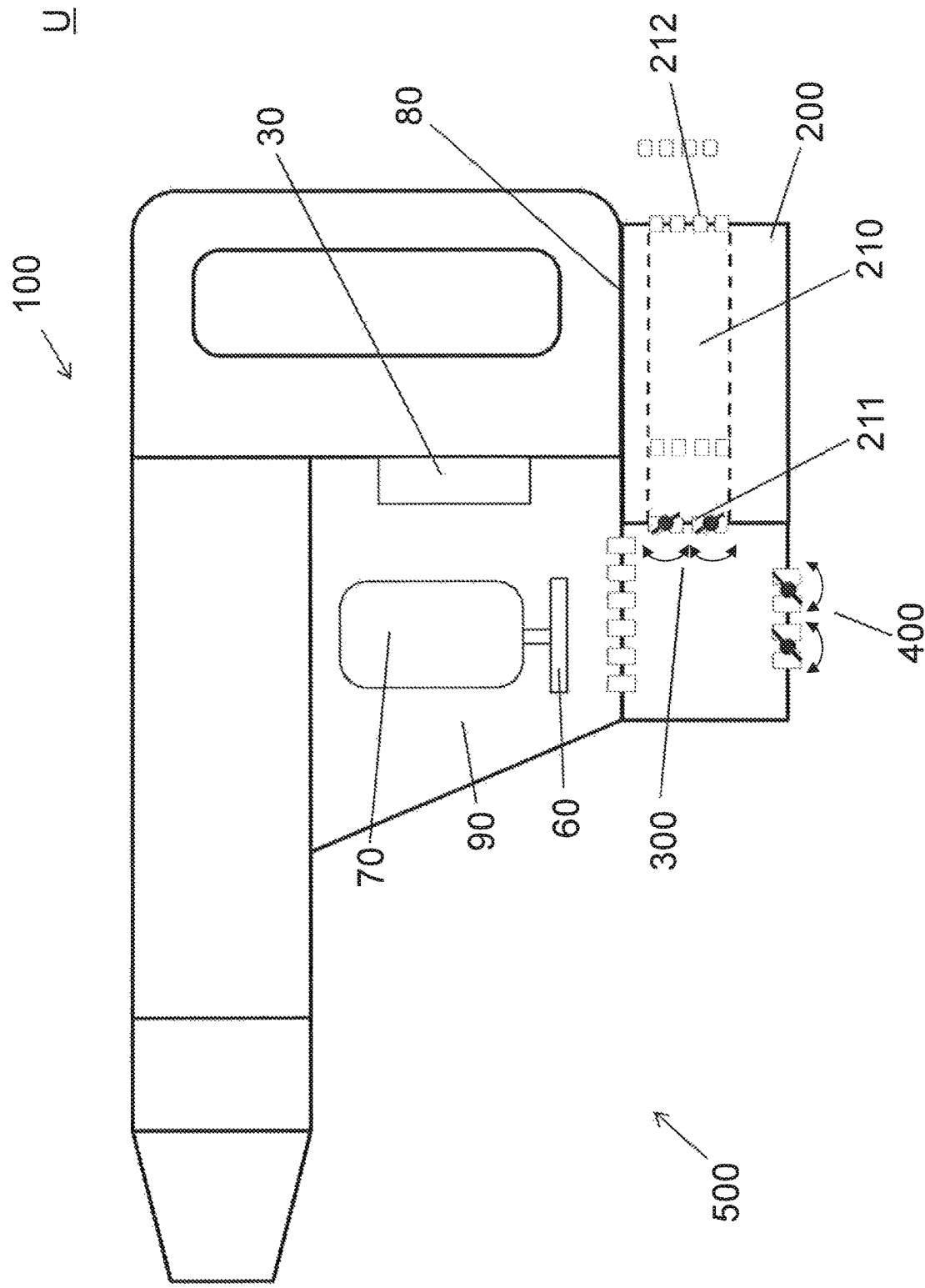

HAND-HELD POWER TOOL, FANLESS STORAGE BATTERY

This application claims the priority of International Application No. PCT/EP2015/078006, filed Nov. 30, 2015, and European Patent Document No. 14195558.3, filed Dec. 1, 2014, the disclosures of which are expressly incorporated by reference herein.

BACKGROUND AND SUMMARY OF THE INVENTION

The present invention relates to a hand-held power tool, in particular a hammer drill or combination hammer comprising a tool housing which has a receiving recess designed to replaceably receive a storage battery or power supply unit, with the hand-held power tool containing an electric drive motor having a cooling fan.

The electric drive motor of the hand-held power tool, which generates heat during operation, can be cooled by the cooling fan.

Hand-held power tools, in particular a hammer drill or combination hammer, can be selectively supplied with electric power by a storage battery or a power supply unit if they are connected to the hand-held power tools. For this purpose, the power supply unit has a power cable which establishes a connection to the mains power supply (also referred to as a power outlet).

The present invention also relates to a fanless storage battery for a hand-held power tool, with the fanless storage battery being designed to be replaceably received inside a receiving recess of a hand-held power tool.

The present invention further relates to a tool system comprising a hand-held power tool and a fanless storage battery.

The object of the present invention is to provide a hand-held power tool, a storage battery and a tool system with improved cooling properties.

With regard to the hand-held power tool, the object is achieved by the tool housing having a first vent portion which is located in the receiving recess and through which a volume flow generated by the cooling fan can be guided.

According to an advantageous embodiment of the present invention, the first vent portion can be provided such that the volume flow can be guided through the storage battery received in the receiving recess with a partial open surface. The storage battery can be hereby efficiently cooled by means of the cooler of the hand-held power tool without a separate cooler having to be provided in the storage battery.

In order to provide a direct cooling flow for the hand-held power tool and in particular for the drive motor which ensures efficient cooling, it may be advantageous for the tool housing to have a second vent portion that is different from the first vent portion and is located outside of the receiving recess and through which the volume flow generated by the cooling fan can be at least partially guided.

According to a further advantageous embodiment, it may be possible for the hand-held power tool to have a flow control means which is designed to distribute a volume flow generated by the cooling fan between the first vent portion and the second vent portion. The volume flow of the cooling fan can be hereby controlled such that both the storage battery and the drive motor are cooled.

Since the temperature of the storage battery can rise to a critical value during its use in the hand-held power tool, whereby the performance or even the functionality of the storage battery is negatively affected, it may be advantageous for the flow control means to be regulatable depending on a temperature measured in the storage battery.

According to a preferred embodiment of the present invention, it may be advantageous for the flow control means to be regulatable depending on at least one temperature measured in the hand-held power tool. The hand-held power tool and in particular the drive motor can be hereby effectively and targetedly cooled with the aid of the volume flow of the cooling fan when they have reached a critical temperature.

In order to allow the entire volume flow of the cooling fans to flow either only through the storage battery or only through the hand-held power tool in order to therefore reach maximum cooling either of the storage battery or the hand-held power tool, it may be advantageous for the flow control means to be designed as a change-over flap that can be actuated by a control device, the change-over flap closing the first vent portion in a first switch position and closing the second vent portion in a second switch position.

According to an advantageous embodiment of the present invention, the change-over flap can be set in at least one switch position between the first switch position and the second switch position whereby a higher proportion of volume flow is allocated either through the first vent portion or the second vent portion. Either stronger cooling of the storage battery and weaker cooling of the hand-held power tool or else stronger cooling of the hand-held power tool and weaker cooling of the storage battery can be hereby achieved. Furthermore, identically strong cooling of the storage battery and the hand-held power tool is also simultaneously possible.

It has been found to be advantageous when the first vent portion and the second vent portion are associated with vents that are different to each other. Alternatively, the first vent portion and the second vent portion can belong to the same vent. The first vent portion and the second vent portion are preferably located substantially perpendicular to each other.

With regard to the fanless storage battery for a hand-held power tool that has a receiving recess designed to replaceably receive the storage battery and an electric drive motor having a cooling fan, the present object is achieved by the fanless storage battery having an inner ventilation channel that is open to the environment via which the fanless storage battery can be force-cooled by means of a volume flow generated by the cooling fan of the hand-held power tool when the fanless storage battery is received in the receiving recess of the hand-held power tool.

With regard to the tool system, the present object is achieved by a tool system which has a previously described hand-held power tool and a previously described fanless storage battery.

Further advantages will emerge from the following description of the figures. Different exemplary embodiments of the present invention are represented in the figures. The figures, the description and the claims contain numerous features in combination. The person skilled in the art will also expediently consider the features individually and combine them to form appropriate further combinations.

The same and similar components are numbered with the same reference numerals.

BRIEF DESCRIPTION OF THE DRAWINGS

FIG. 7 is a schematic representation of a hand-held power tool according to the invention having the fanless storage battery according to a fourth embodiment.

DETAILED DESCRIPTION OF THE DRAWINGS

Figure 1:
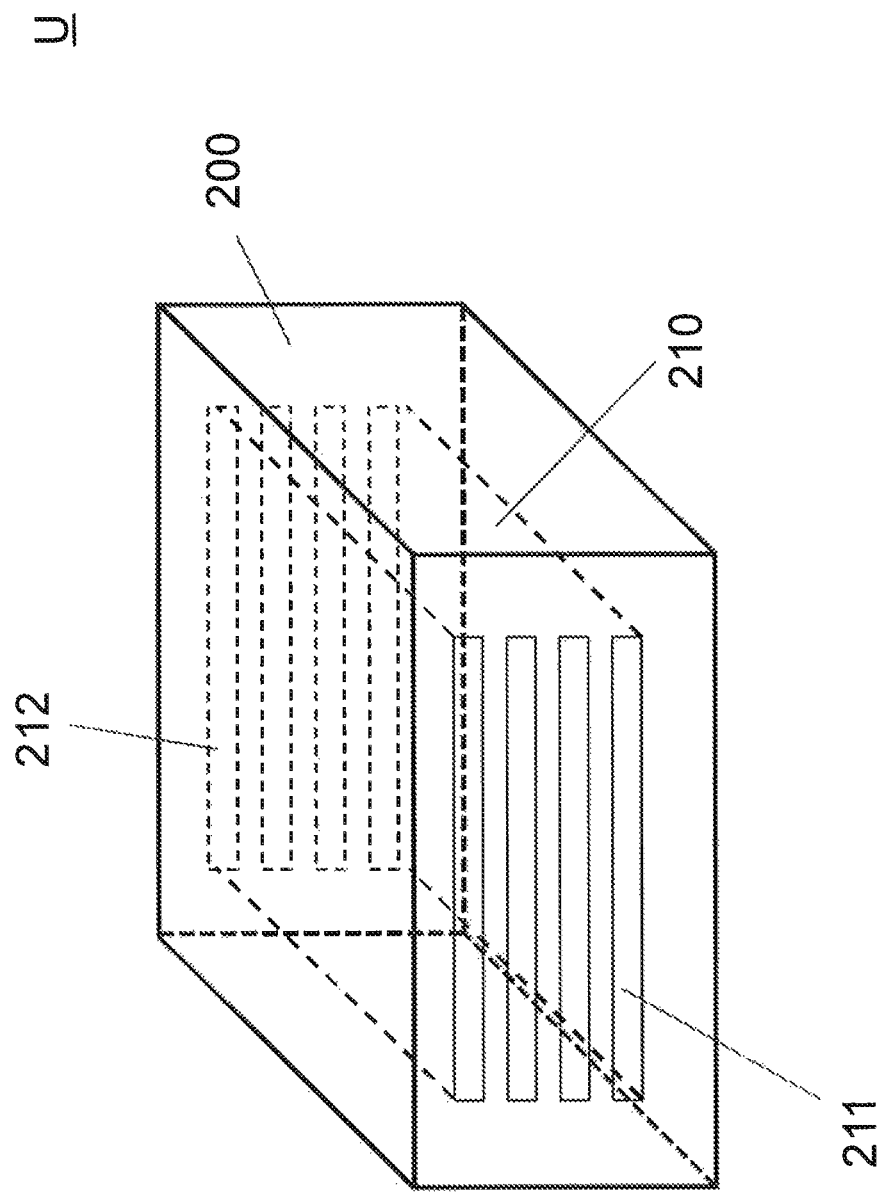
FIG. 1 is a schematic representation of a fanless storage battery according to the invention.

FIG. 1 shows a fanless storage battery 200 according to the invention. The storage battery 200 is designed to be replaceably received without using a tool in a receiving recess 80 not shown (see FIG. 2), with a representation of fastening means being dispensed with in this case.

The storage battery 200 contains an inner ventilation channel 210 via which the storage battery 200 is force-cooled. The inner ventilation channel 210 runs between a front vent 211 and a rear vent 212 which are located on opposing front sides of the storage battery 200. The storage battery 200 as well as the cells and electronics, which are located inside the storage battery 200, can be cooled with the aid of the inner ventilation channel 210 or a ventilation flow guided through the ventilation channel 210. The cells and the electronics of the storage battery 200 are not shown in the figures. The storage battery 200 has an open surface through the front vent 211 and rear vent 212.

Figure 2:
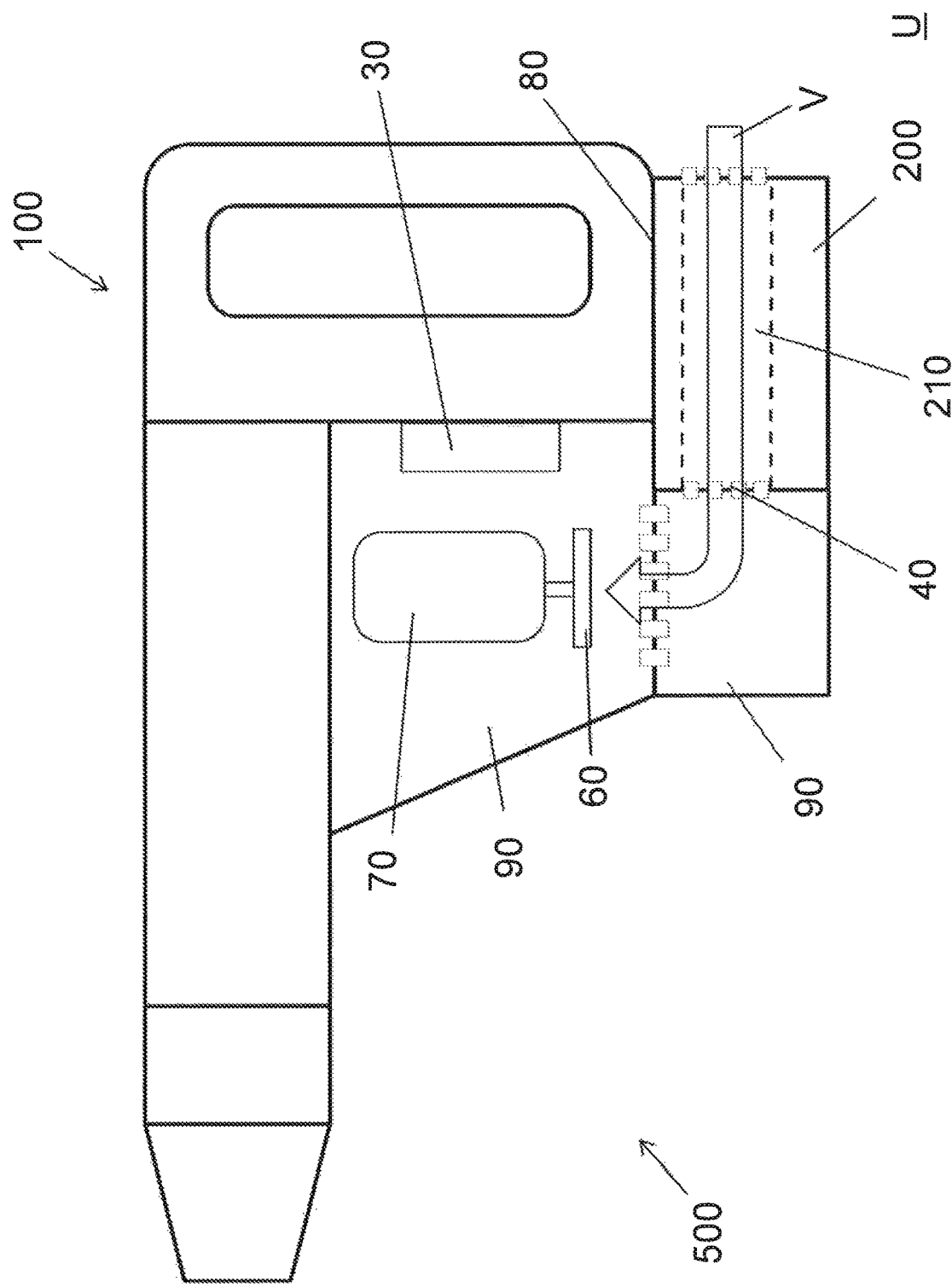
FIG. 2 is a schematic representation of a hand-held power tool according to the invention having the fanless storage battery according to a first embodiment.

A first embodiment of a hand-held power tool 100 according to the invention in the form of a hammer drill is represented in FIG. 2. The hand-held power tool 100 in this case contains substantially one tool housing 90 which has a receiving recess 80 designed to replaceably receive a storage battery 200. The receiving recess 80 serves to replaceably receive the storage battery 200. An electric drive motor 70 having a cooling fan 60 as well as a control device 30 are further positioned in the tool housing 90. The drive motor 70 serves to generate a torque which is transferred via a gear mechanism to a tool. Neither the gear mechanism nor the tool is represented in the figures. The control device 30 serves to control and regulate the drive motor 70, a change-over flap 20 as well as a first and second slat arrangement 10a, 10b. The control device 30 is for this purpose connected via lines that are not shown to the drive motor 70, the change-over flap 20 and the slat arrangements 10a, 10b. The change-over flap 20 as well as the first and second slat arrangement 10a, 10b are described below in detail.

As is also visible in FIG. 2, the tool housing 90 contains a first vent portion 40. The first vent portion 40 substantially constitutes one opening into the tool housing 90 through which the cooling fan 60 can suction cooling air from the environment U. The first vent portion 40 is in this case arranged towards the receiving recess 80 such that the front vent 211 of the storage battery 200 rests on the vent portion 40 when the storage battery 200 is connected to the hand-held power tool 100 in the receiving recess 80. A volume flow, which is suctioned by the cooling fan 60 inside the hand-held power tool 100 from the environment U, can flow through the storage battery 200 with the aid of the previously described inner ventilation channel 210 in order to cool the storage battery. The volume flow V in this case enters through the rear vent 212 into the storage battery 200, crosses the ventilation channel 210, enters through the front vent 211 from the storage battery 200 and enters through the first vent portion 40 into the tool housing 90. The storage battery 200 is thus cooled by the volume flow V of the cooling fan 60.

Figure 3:
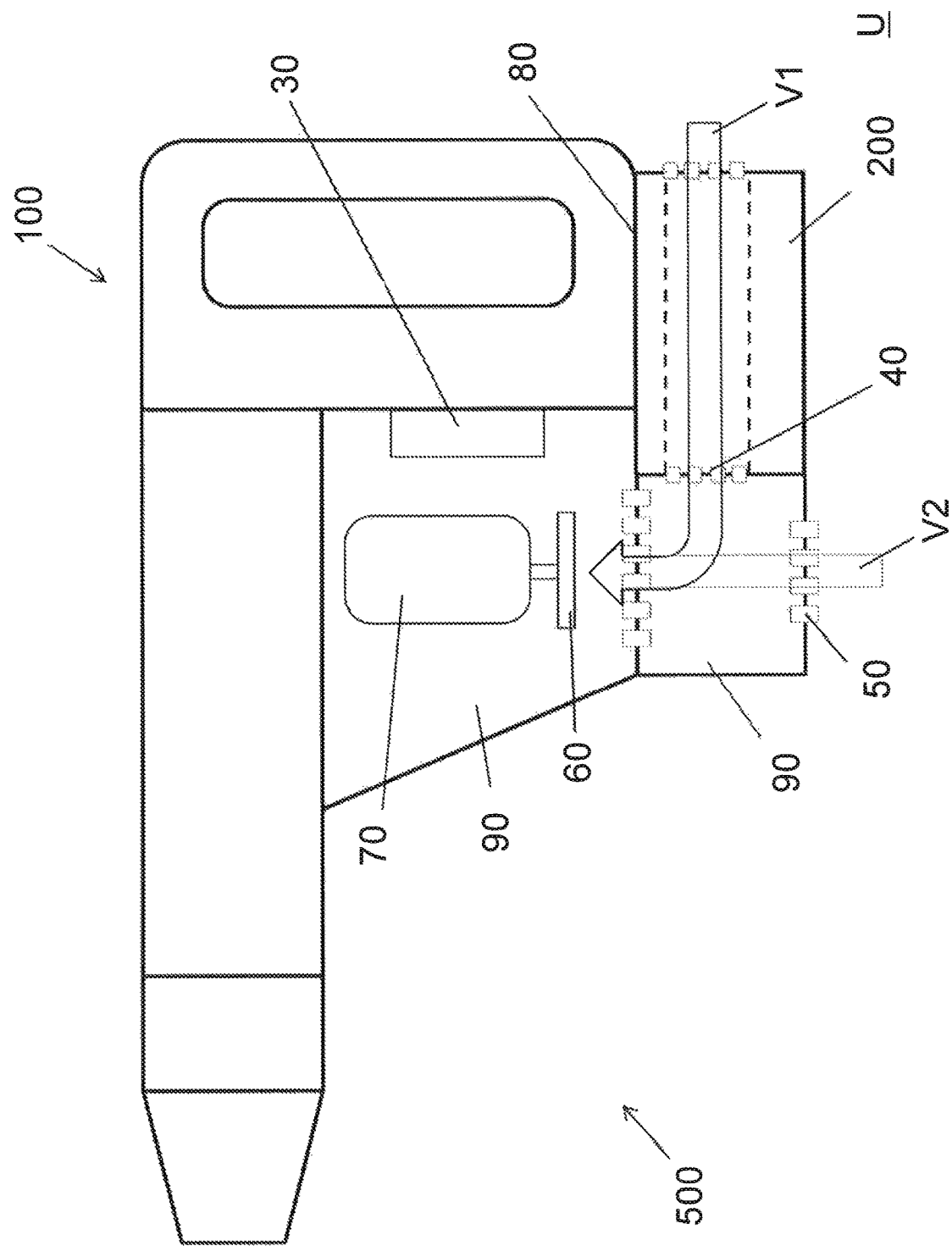
FIG. 3 is a schematic representation of a hand-held power tool according to the invention having the fanless storage battery according to a second embodiment.

FIG. 3 shows a second embodiment of the hand-held power tool 100 according to the invention which is substantially identical to the first embodiment. Unlike the first embodiment, the tool housing 90 contains a second vent portion 50 in addition to the first vent portion 40. As is visible in FIG. 3, the first vent portion 40 and the second vent portion 50 are associated with vents that are different to each other which are located perpendicular to each other on the tool housing 90. The second vent portion 50, like the first vent portion 40, constitutes an opening into the tool housing 90 through which a volume flow V generated by the cooling fan 60 can be suctioned from the environment U into the inside of the hand-held power tool 100. In this case, a first volume flow V1 is suctioned through the first vent portion 40 and a second volume flow V2 is suctioned through the second vent portion 50. According to the second embodiment, in relation to the first embodiment, separate cooling in the form of the volume flow V2 is provided for the drive motor 70 through the second vent portion 50 which is not guided through the storage battery 200 and consequently is also not heated by the storage battery 200.

Figure 4:
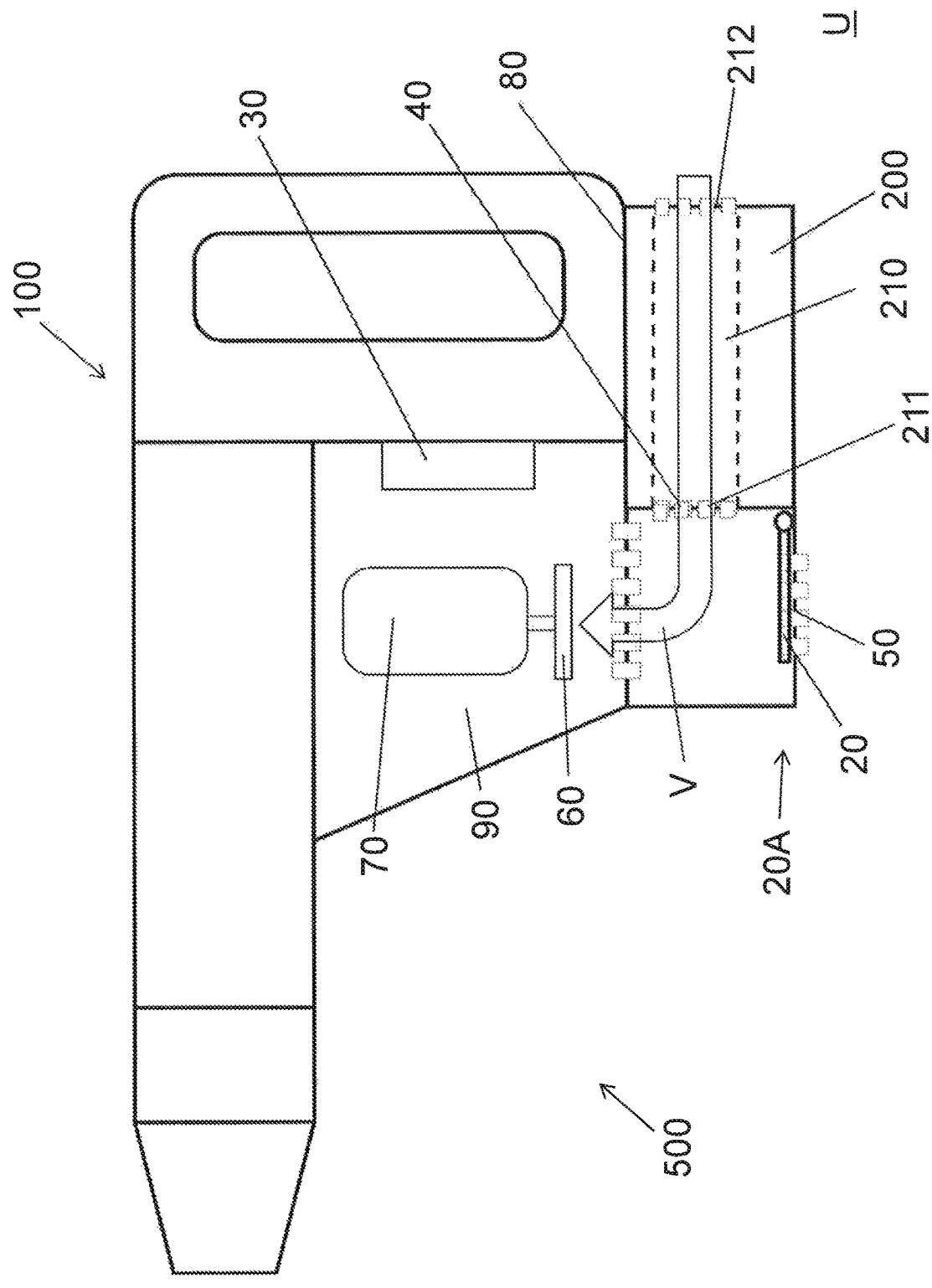
FIG. 4 is a schematic representation of a hand-held power tool according to the invention having the fanless storage battery according to a third embodiment with a change-over flap in a first switch position.
Figure 5:
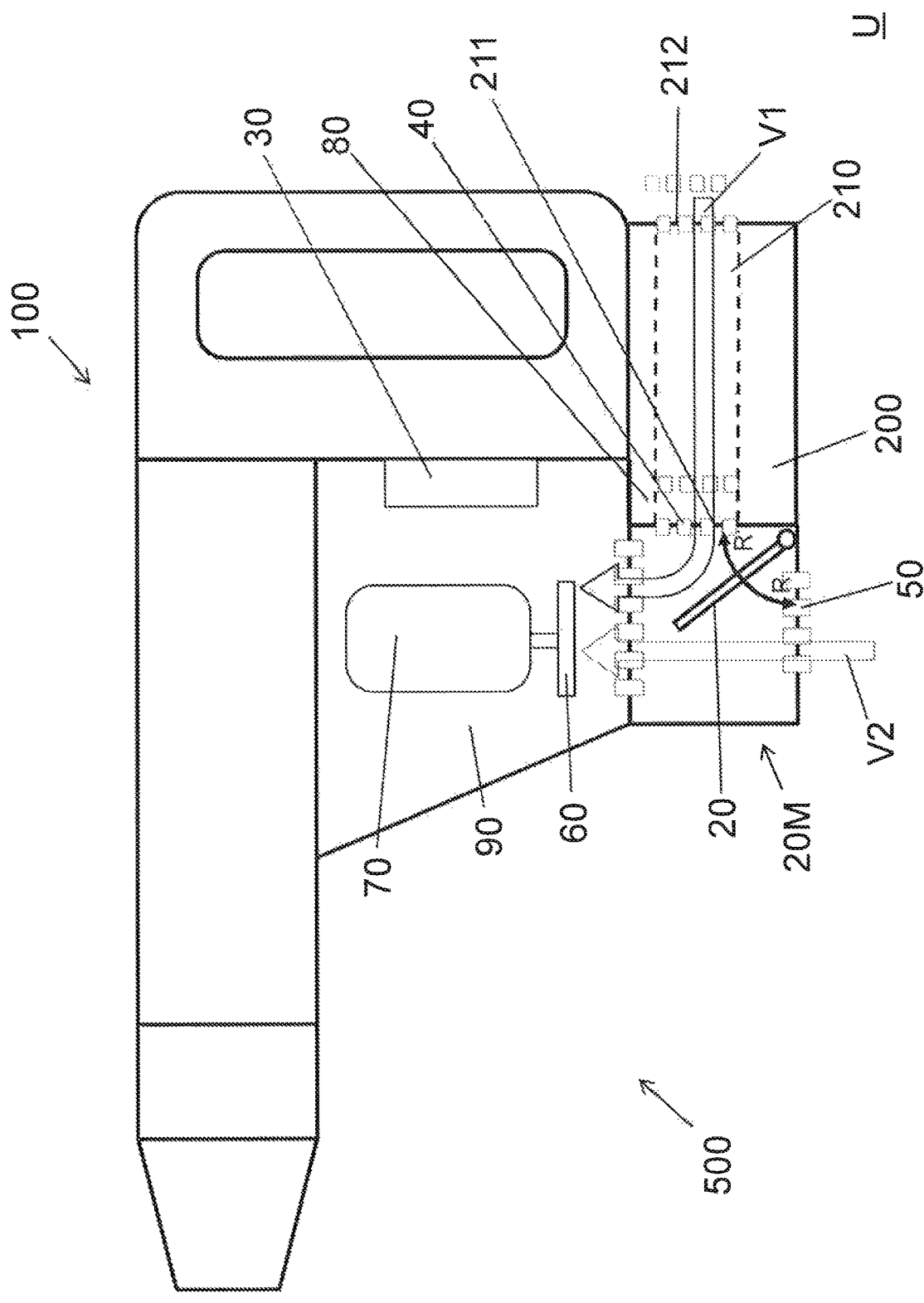
FIG. 5 is a schematic representation of a hand-held power tool according to the invention having the fanless storage battery according to the third embodiment with a change-over flap in a further switch position.
Figure 6:
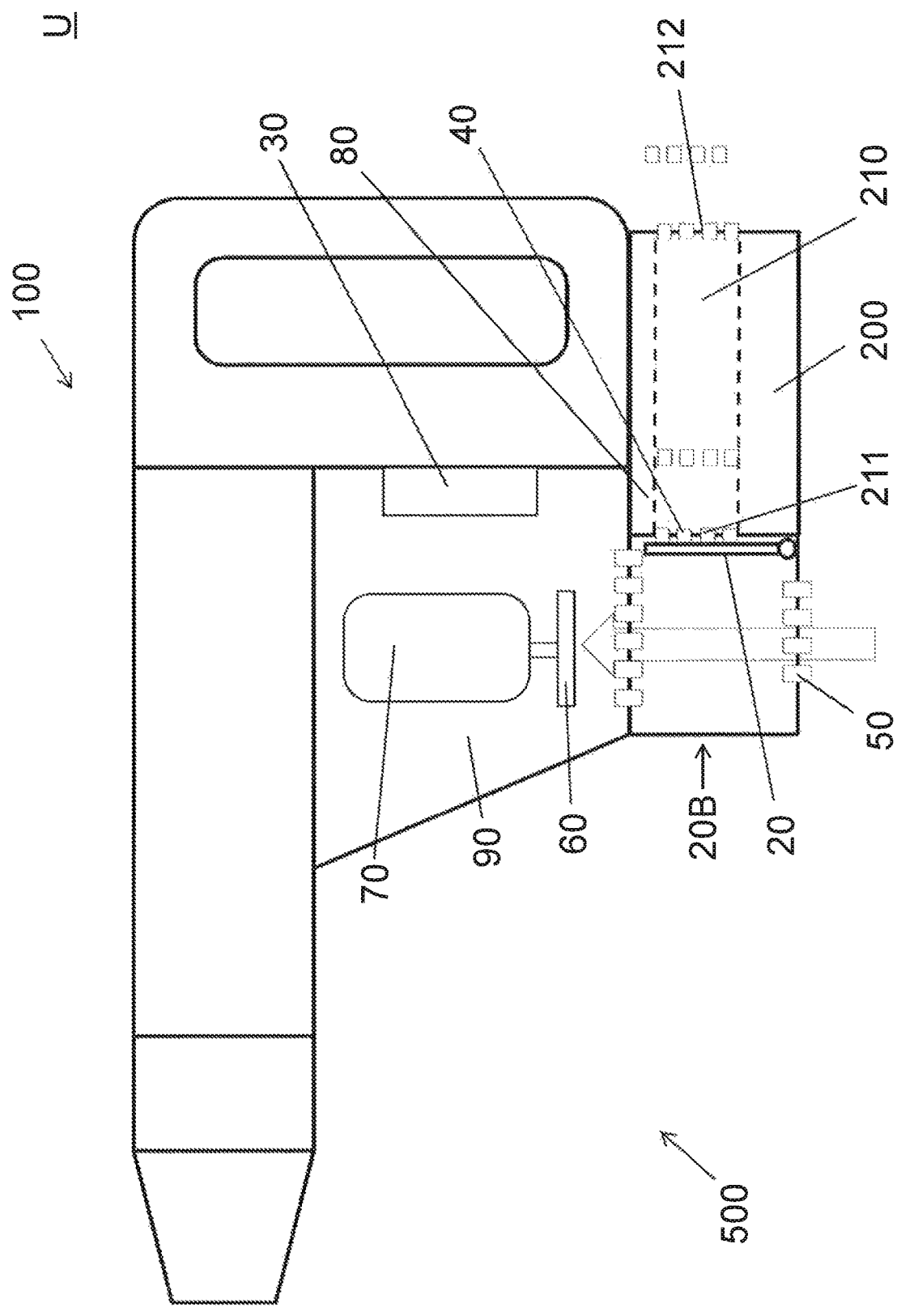
FIG. 6 is a schematic representation of a hand-held power tool according to the invention having the fanless storage battery according to the third embodiment with a change-over flap in a second switch position.

FIGS. 4, 5 and 6 show the hand-held power tool 100 according to the invention according to a third embodiment. The hand-held power tool 100 according to the third embodiment is substantially identical to the hand-held power tool 100 according to the second embodiment. Unlike the hand-held power tool 100 according to the second embodiment, the hand-held power tool 100 according to the third embodiment, also contains a flow control means which is configured to distribute the volume flow V generated by the cooling fan 60 between the first vent portion 40 and the second vent portion 50. As represented in FIGS. 4, 5 and 6, the flow control means is configured in the form of a change-over flap 20. The change-over flap 20 is in this case located in the tool housing 90 such that it can be pivoted continuously and reversibly between a first switch position 20A and a second switch position 20B. The change-over flap 20 can also be set in a middle switch position 20M between the first switch position 20A and the second switch position 20B.

FIG. 4 shows the change-over flap 20 in the first switch position 20A in which the change-over flap 20 completely closes the second vent portion 50 such that no cooling air can be suctioned from the environment U through the second vent portion 50 into the inside of the tool housing 90. At the same time, the first vent portion 40 is completely closed so that the volume flow V is suctioned only through the first vent portion 40 into the inside of the tool housing 90. The storage battery 200 thereby experiences maximum cooling. The change-over flap 20 is horizontal for this purpose.

FIG. 5 shows the change-over flap 20 in the middle switch position 20M in which the first vent portion 40 and the second vent portion 50 are partially open. In the middle switch position 20M cooling air can flow both in the form of a volume flow V1 through the first vent portion 40 and in the form of a volume flow V2 through the second vent portion 50.

FIG. 6 shows the change-over flap 20 in the second switch position 20B in which the change-over flap 20 completely closes the first vent portion 40 such that no cooling air can be suctioned from the environment U through the first vent portion 40 into the inside of the tool housing 90. At the same time, the second vent portion 50 is completely open such that the volume flow V is suctioned only through the second vent portion 50 into the inside of the tool housing 90. The storage battery 200 thereby experiences no cooling in the form of cooling air flowing through the inner ventilation channel 210. The drive motor 70, in contrast, experiences maximum cooling.

The switch position of the change-over flap 20 is controlled and regulated by means of the control device 30. The control device 30 is connected to a first temperature sensor and a second temperature sensor. The first temperature sensor is in this case positioned such that it measures the temperature of the storage battery 200. The second temperature sensor is, in contrast, positioned such that it measures the temperature of the drive motor. The temperature data measured by the respective temperature sensors are sent to the control device 30. The control device 30 can determine whether an excessively high and therefore critical temperature has been reached for the storage battery 200 and/or the drive motor 70 by way of a comparison with reference temperature values stored in the control device 30. If the measured temperature value indicates a storage battery 200 that is too warm, the control device 30 sends a corresponding signal to the change-over flap 20 such that the change-over flap 20 either opens further (i.e. the change-over flap 20 moves in the direction R) or completely pivots into the first switch position 20A. However, if the measured temperature value indicates a drive motor 70 that is too warm, the control device 30 sends a corresponding signal to the change-over flap 20 such that the change-over flap 20 either opens further (i.e. the change-over flap 20 moves in the direction R') or completely pivots into the second switch position 20B. If the measured temperature values indicate simultaneous heating of the storage battery 200 and the drive motor 70, the control device 30 adjusts the change-over flap 20 to a middle switch position 20M such that both the storage battery 200 and the drive motor 70 are correspondingly cooled. In this case, it should be noted that the control device 30 can adjust the change-over flap 20 to any possible switch position between the first switch position 20A and the second switch position 20B.

The first temperature sensor and the second temperature sensor are not represented in the figures. Likewise, the connections from the control device 30 to the change-over flap 20 or to the temperature sensors are also not represented.

FIG. 7 shows the hand-held power tool 100 according to the invention according to a fourth embodiment. The hand-held power tool 100 according to the fourth embodiment is substantially identical to the hand-held power tool 100 according to the third embodiment. Unlike the hand-held power tool 100 according to the third embodiment, the flow control means is configured in the form of a first slat arrangement 300 and a second slat arrangement 400. The first slat arrangement 300 is in this case positioned on the first vent portion 40 and the second slat arrangement 400 is positioned on the second vent portion 50. Depending on the position of the first slat arrangement 300, the first vent portion 40 can either be completely opened, partially closed or completely closed. The first slat arrangement 300 and the second slat arrangement 400 can for this purpose be reversibly pivoted in the direction of the arrows in FIG. 7. Accordingly, depending on the position of the second slat arrangement 400, the second vent portion 50 can either be completely opened, partially closed or completely closed. The first and second slat arrangement 300, 400 is shown in FIG. 7 in a partially closed position. The position of the slat arrangement 300, 400 for this purpose serves to increase or reduce the respective volume flow through the first vent potion 40 and the second vent portion 50.

The slat arrangements 300, 400 are connected to the control device 30 such that (as already described above with respect to the third embodiment) the control device 30 either further opens or closes the slat arrangements 300, 400 corresponding to the respectively measured temperature value in the storage battery 200 or in the drive motor 70.

LIST OF REFERENCE NUMERALS

V volume flow
U environment
20 change-over flap
20A first switch position
20M middle switch position
20B second switch position
30 control device
40 first vent portion
50 second vent portion
60 cooling fan
70 electric drive motor
80 receiving recess
90 tool housing
100 hand-held power tool
200 storage battery
210 ventilation channel
211 front vent
212 rear vent
300 first slat arrangement
400 second slat arrangement
500 tool system

The invention claimed is:

1. A hand-held power tool, comprising:
   a tool housing which has a receiving recess, wherein a storage battery or a power supply unit is replaceably receivable in the receiving recess; and
   an electric drive motor with a cooling fan disposed within the tool housing;
   wherein the tool housing has a first vent portion which is disposed in the receiving recess and wherein a volume flow generated by the cooling fan is guidable through the first vent portion;
   wherein the tool housing has a second vent portion, wherein the second vent portion is disposed outside of the receiving recess, and wherein the volume flow generated by the cooling fan is at least partially guidable through the second vent portion; and
   a flow control means, wherein the volume flow generated by the cooling fan is distributable between the first vent portion and the second vent portion by the flow control means.

2. The hand-held power tool according to claim 1, wherein the hand-held power tool is a hammer drill or a combination hammer.

3. The hand-held power tool according to claim 1, wherein the volume flow is guidable through a storage battery disposed in the receiving recess.

4. The hand-held power tool according to claim 1, wherein the flow control means is regulatable depending on a temperature value measured in a storage battery disposed in the receiving recess.

5. The hand-held power tool according to claim 1, wherein the flow control means is regulatable depending on at least one temperature value measured in the hand-held power tool.

6. The hand-held power tool according to claim 1, wherein the flow control means is a change-over flap that is actuatable by a control device, wherein the change-over flap closes the first vent portion in a first switch position and closes the second vent portion in a second switch position.

7. The hand-held power tool according to claim 6, wherein the change-over flap is settable in a third switch position between the first switch position and the second switch position.

8. The hand-held power tool according to claim 1, wherein the first vent portion and the second vent portion are each associated with a respective vent.

9. A fanless storage battery in combination with the hand-held power tool according to claim 1, comprising:
   an inner ventilation channel in the fanless storage battery that is open to an environment, wherein the fanless storage battery is force-coolable by a volume flow generated by the cooling fan of the hand-held power tool via the inner ventilation channel when the fanless storage battery is disposed in the receiving recess of the hand-held power tool.

* * * * *